(12) United States Patent
Nordback

(10) Patent No.: US 7,903,286 B2
(45) Date of Patent: Mar. 8, 2011

(54) SYSTEMS AND METHODS FOR COLOR CONVERSION

(75) Inventor: Kurt Nordback, Boulder, CO (US)

(73) Assignee: Konica Minolta Systems Laboratory, Inc., Huntington Beach, CA (US)

( * ) Notice: Subject to any disclaimer, the term of this patent is extended or adjusted under 35 U.S.C. 154(b) by 326 days.

(21) Appl. No.: 12/078,112

(22) Filed: Mar. 27, 2008

(65) Prior Publication Data

US 2009/0244563 A1 Oct. 1, 2009

(51) Int. Cl.
*G06F 15/00* (2006.01)
*G03F 3/08* (2006.01)
*G06K 9/00* (2006.01)

(52) U.S. Cl. .......... 358/1.9; 358/518; 358/520; 358/521; 358/523; 382/162; 382/167

(58) Field of Classification Search .................. 358/1.9, 358/518, 520, 521, 523; 382/162, 167; 345/431, 345/594, 590, 589, 593

See application file for complete search history.

(56) References Cited

U.S. PATENT DOCUMENTS

| | | | |
|---|---|---|---|
| 6,178,007 B1 | 1/2001 | Harrington | |
| 6,195,674 B1 | 2/2001 | Elbourne et al. | |
| 6,222,648 B1 | 4/2001 | Wolf et al. | |
| 6,237,079 B1 | 5/2001 | Stoney | |
| 6,246,396 B1 | 6/2001 | Gibson et al. | |
| 6,259,456 B1 | 7/2001 | Gibson et al. | |
| 6,269,184 B1 * | 7/2001 | Spaulding et al. | 382/167 |
| 6,272,257 B1 | 8/2001 | Prokop | |
| 6,275,607 B1 | 8/2001 | Shimizu et al. | |
| 6,289,138 B1 | 9/2001 | Yip et al. | |
| 6,311,258 B1 | 10/2001 | Gibson et al. | |
| 6,336,180 B1 | 1/2002 | Long et al. | |
| 6,349,379 B2 | 2/2002 | Gibson et al. | |
| 6,393,545 B1 | 5/2002 | Long et al. | |
| 6,414,687 B1 | 7/2002 | Gibson | |
| 6,421,140 B1 | 7/2002 | Hui | |
| 6,507,898 B1 | 1/2003 | Gibson et al. | |
| 6,642,931 B1 | 11/2003 | Haikin et al. | |
| 6,674,536 B2 | 1/2004 | Long et al. | |
| 6,707,463 B1 | 3/2004 | Gibson et al. | |
| 6,774,953 B2 | 8/2004 | Champion et al. | |
| 6,819,782 B1 | 11/2004 | Imagawa et al. | |
| 6,839,150 B1 | 1/2005 | Sugiura et al. | |
| 6,870,636 B2 | 3/2005 | Kulkarni | |
| 6,873,432 B1 | 3/2005 | Thieret | |
| 6,906,834 B1 | 6/2005 | Kagawa et al. | |
| 6,930,809 B1 | 8/2005 | Kagawa et al. | |
| 6,990,039 B2 | 1/2006 | Hirai | |

(Continued)

*Primary Examiner* — Charlotte M Baker
(74) *Attorney, Agent, or Firm* — Finnegan, Henderson, Farabow, Garrett & Dunner, L.L.P.

(57) ABSTRACT

Systems and methods are provided for dynamically converting first color data to second color data using a look-up table, wherein the first color data is a subset of a first color space, and the second color data is a subset of a second color space. In some embodiments, at least one first color value is input in the first color data. At least one look-up table entry may be calculated for the at least one first color value in the first color data, if the look-up table entry has not been previously calculated. The at least one calculated look-up table entry may be stored. At least one value in the second color data, which corresponds to the at least one first color value, can be computed based on the at least one first color value and the stored value of the at least one look-up table entry.

18 Claims, 4 Drawing Sheets

U.S. PATENT DOCUMENTS

| | | |
|---|---|---|
| 6,995,864 B1 | 2/2006 | Sugiura et al. |
| 7,012,639 B1 | 3/2006 | Ishikawa et al. |
| 7,119,927 B2 | 10/2006 | Sugiura et al. |
| 7,142,710 B2 | 11/2006 | Hung |
| 7,190,827 B2 | 3/2007 | Zeng et al. |
| 7,263,218 B2 | 8/2007 | Altenhof-Long et al. |
| 7,274,487 B2 | 9/2007 | Fukasawa |
| 7,292,949 B2 | 11/2007 | Ding |
| 7,598,964 B2 * | 10/2009 | Olson ........................... 345/594 |
| 2001/0021971 A1 | 9/2001 | Gibson et al. |
| 2002/0057446 A1 | 5/2002 | Long et al. |
| 2002/0063911 A1 | 5/2002 | Hui |
| 2002/0069236 A1 * | 6/2002 | Jahnke ........................... 709/104 |
| 2003/0016305 A1 | 1/2003 | Champion et al. |
| 2003/0034986 A1 | 2/2003 | Fukasawa |
| 2003/0098986 A1 | 5/2003 | Pop |
| 2003/0138142 A1 | 7/2003 | Hung |
| 2003/0147088 A1 | 8/2003 | Kulkarni |
| 2004/0021882 A1 | 2/2004 | Kakutani |
| 2004/0032615 A1 | 2/2004 | Kurakata |
| 2004/0101195 A1 | 5/2004 | Akaishi |
| 2004/0141642 A1 | 7/2004 | Zeng et al. |
| 2004/0151361 A1 | 8/2004 | Bedard et al. |
| 2004/0184658 A1 | 9/2004 | Inoue |
| 2004/0212814 A1 | 10/2004 | Ishigami |
| 2004/0223173 A1 | 11/2004 | Arai |
| 2004/0257596 A1 | 12/2004 | Mestha et al. |
| 2005/0027482 A1 | 2/2005 | Benaoudia et al. |
| 2005/0117398 A1 | 6/2005 | Hirai |
| 2005/0135672 A1 | 6/2005 | Altenhof-Long et al. |
| 2005/0185840 A1 | 8/2005 | Sugiura et al. |
| 2006/0001728 A1 | 1/2006 | Murakami |
| 2006/0071938 A1 | 4/2006 | Richardson et al. |
| 2007/0057961 A1 | 3/2007 | Enami et al. |

* cited by examiner

SYSTEMS AND METHODS FOR COLOR CONVERSION

TECHNICAL FIELD

This disclosure relates to color conversion for printing systems and in particular, to systems and methods for increasing color conversion speed.

DESCRIPTION OF RELATED ART

Image printing and display devices usually require conversion of color data of an image from one color space to another color space, in order to properly print or display the image generated by an independent image generating device. For example, an image may be produced on a camera that uses a Red, Green, and Blue ("RGB") color space, and may be printed by a printer that uses a Cyan, Magenta, Yellow, and BlacK ("CMYK") color space. A color conversion system may utilize a color management module ("CMM") to accomplish the color conversion tasks from a source device such as a camera or monitor to a destination device such as a a printer.

A typical color conversion from color space A to color space B, as performed in accordance with the International Color Consortium (ICC) specification, can involve two steps: a first conversion from color space A to a profile connection space ("PCS") and a second conversion from PCS to color space B. PCS may be a device-independent color space such as, for example, Commission Internationale de l'Eclairage XYZ (CIE XYZ) color space. Each of the two mapping functions may be represented by a look-up table in a color profile. In practice, this two-step color conversion may be inefficient. To improve the efficiency of color conversion, a CMM usually creates a single mapping that combines the mapping from A to PCS and the mapping from PCS to B, and stores the single combined mapping in a combined color conversion look-up table.

Conventionally, a CMM may compute all the entries of the combined look-up table and store them in memory before color conversions take place. During the color conversion process, the CMM may access the combined look-up table in memory and obtain entries of the look-up table needed to perform the interpolation involved in converting color values. In some alternative approaches, values for color space conversion are computed as needed, used, and then immediately discarded after use.

Although the systems and methods disclosed in the prior art perform color conversion, they may nevertheless be suboptimal. For example, pre-constructing the entire combined look-up table may be both time and memory consuming, especially for multi-dimensional color conversions and/or color data that are highly localized in color space (and therefore only a small subset of the look-up table may be used). On the other hand, computing color space conversion values as needed and discarding them right after they are used forces repetition of computations when the same color space conversions are performed at a later point in time, and may be slower than interpolation. Such repeated calculations result in significant waste of time and computational resources. Therefore, there is a need for systems and methods that make more optimal use of resources during the color conversion process.

SUMMARY

In accordance with the present invention, systems and methods are provided for dynamically converting first color data to second color data using a look-up table, wherein the first color data is a subset of a first color space, and the second color data is a subset of a second color space. In some embodiments, at least one first color value is input in the first color data. At least one look-up table entry may be calculated for the at least one first color value in the first color data, if the look-up table entry has not been previously calculated. The at least one calculated look-up table entry may be stored. At least one value in the second color data, which corresponds to the at least one first color value, can be computed based on the at least one first color value and the stored value of the at least one look-up table entry.

Embodiments of the present invention also relate to software, firmware, and program instructions created, stored, accessed, or modified by processors using computer-readable media or computer-readable memory. The methods described may be performed on a computer and/or a printing device.

Additional objects and advantages will be set forth in part in the description, which follows, and in part will be obvious from the description, or may be learned by practice. The objects and advantages will be realized and attained by means of the elements and combinations particularly pointed out in the appended claims. It is to be understood that both the foregoing general description and the following detailed description are exemplary and explanatory only and are not restrictive of the invention, as claimed. These and other embodiments are further explained below with respect to the following figures.

DETAILED DESCRIPTION

Reference will now be made in detail to various embodiments, which are illustrated in the accompanying drawings. Wherever possible, the same reference numbers will be used throughout the drawings to refer to the same or like parts.

Figure 1:
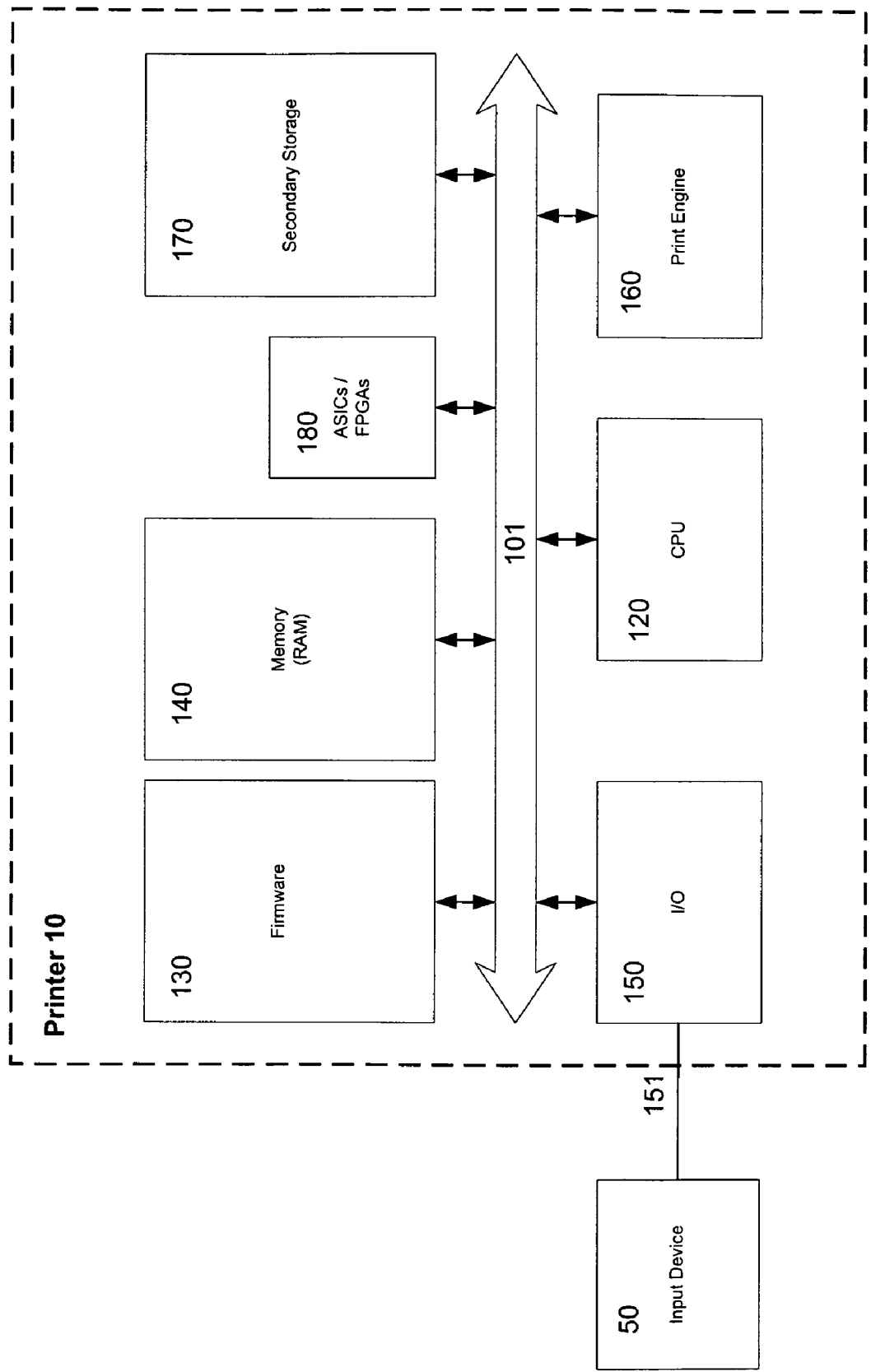
FIG. 1 shows a block diagram of an exemplary printer.

FIG. 1 shows a block diagram of an exemplary printer 10, according to disclosed embodiments. In general, printer 10 may be any device that can be configured to produce physical documents from electronic data including, but not limited to, electrophotographic printers, such as laser printers and LED printers, ink-jet printers, thermal printers, laser imagers, and offset printers. Printer 10 may have image transmitting/receiving function, image scanning function, and/or copying function, as installed in facsimile machines and digital copiers. The methods and apparatus described in this document may also be applied to these various printer device types with appropriate modifications and in a manner consistent with embodiments disclosed herein.

In some embodiments, printer 10 may contain an input-output port 150, and printer 10 may be able to access an input device 50 using I/O ports 150 and connection 151. Printer 10 may receive input print data, including color data, from input device 50. For example, input device 50 may be a general purpose computer that includes a monitor to display the source color data. The general purpose computer may further include applications, such as Adobe Photoshop™ to process the print data. In some embodiments, input device 50 may be an image generating device such as a camera.

Input device 50 may be coupled to printer 10 via a wired or wireless connection 151 using conventional communication protocols and/or data port interfaces. In general, connection 151 can be any communication channel that allows transmission of data between the devices. In one embodiment, for example, the devices may be provided with conventional data ports, such as parallel ports, serial ports, Ethernet, USB, SCSI, FIREWIRE, and/or coaxial cable ports for transmission of data through the appropriate connection.

Input device 50 may use a source color space to represent the source color data, such as, a standard RGB (SRGB) color space, a CMY color space, a CMYK color space, or any other types of color spaces. Printer 10, on the other hand, may use a color space native to printer 10 to represent color data. In some embodiments, the native color space of printer 10 may not match the source color space of input device 50. Therefore, a color conversion of the source color data from the source color space to the native color space of printer 10 may be performed to print color data using printer 10.

Printer 10 may further include a bus 101 that couples CPU 120, a firmware 130, a memory 140, a print engine 160, and secondary storage device 170. Printer 10 may also include other Application Specific Integrated Circuits (ASICs), and/or Field Programmable Gate Arrays (FPGAs) 180 that are capable of executing portions of an application to perform color space conversions in a manner consistent with disclosed embodiments. In some embodiments, printer 10 may also be capable of executing software including a printer operating system and other appropriate application software, including software to perform color space conversions. In some embodiments, printer 10 may allow paper sizes, output trays, color selections, and print resolution, among other options, to be user-configurable.

In some embodiments, CPU 120 may be a general-purpose processor, a special purpose processor, or an embedded processor. CPU 120 can exchange data including control information and instructions with memory 140 and/or firmware 130. Memory 140 may be any type of Dynamic Random Access Memory ("DRAM") such as but not limited to SDRAM, or RDRAM. Firmware 130 may hold instructions and data including, but not limited to, a boot-up sequence, pre-defined routines, routines to perform color space conversions, and other code. In some embodiments, code and data in firmware 130 may be copied to memory 140 prior to being acted upon by CPU 120. In some embodiments, data and instructions in firmware 130 may be upgradeable.

In some embodiments, firmware 130 may also include routines to perform a color conversion between the source color space associated with input device 50 and the native color space associated with printer 10, and store the converted color data in memory 140. In some embodiments, the routines may include code that can be executed by CPU 120 to perform various color conversion operations. Routines in firmware 130 may also include code to process the input color data and related color space information received from input device 50. It is also contemplated that portions of routine to perform one or more color space conversion operations may be stored on a removable computer readable medium, such as a hard drive, computer disk, CD-ROM, DVD ROM, CD±RW or DVD±RW, USB flash drive, memory stick, or any other suitable medium, and may run on any suitable subsystem of printer 10. For example, portions of applications to perform color space conversion operations may reside on a removable computer readable medium and be read and acted upon by CPU 120 using routines in firmware 130 that have been copied to memory 140.

In some embodiments, CPU 120 may act upon instructions and data and provide control and data to ASICs/FPGAs 180 and print engine 160 to generate printed documents. In some embodiments, ASICs/FPGAs 180 may also provide control and data to print engine 160. FPGAs/ASICs 180 may also implement one or more of translation, compression, and color conversion algorithms.

In some embodiments, input color data, source color profile, native color profile, computed look-up table, and converted color data may be stored in memory 140 or secondary storage 170. Exemplary secondary storage 170 may be an internal or external hard disk, Memory Stick™, or any other memory storage device capable of being used in printer 10. Memory to store computed look-up table may be a dedicated memory or form part of a general purpose memory, or some combination thereof according to some embodiments of the present invention. In some embodiments, memory may be dynamically allocated to hold the look-up table as needed. In some embodiments, memory allocated to store the look-up table may be dynamically released after processing.

Figure 2:
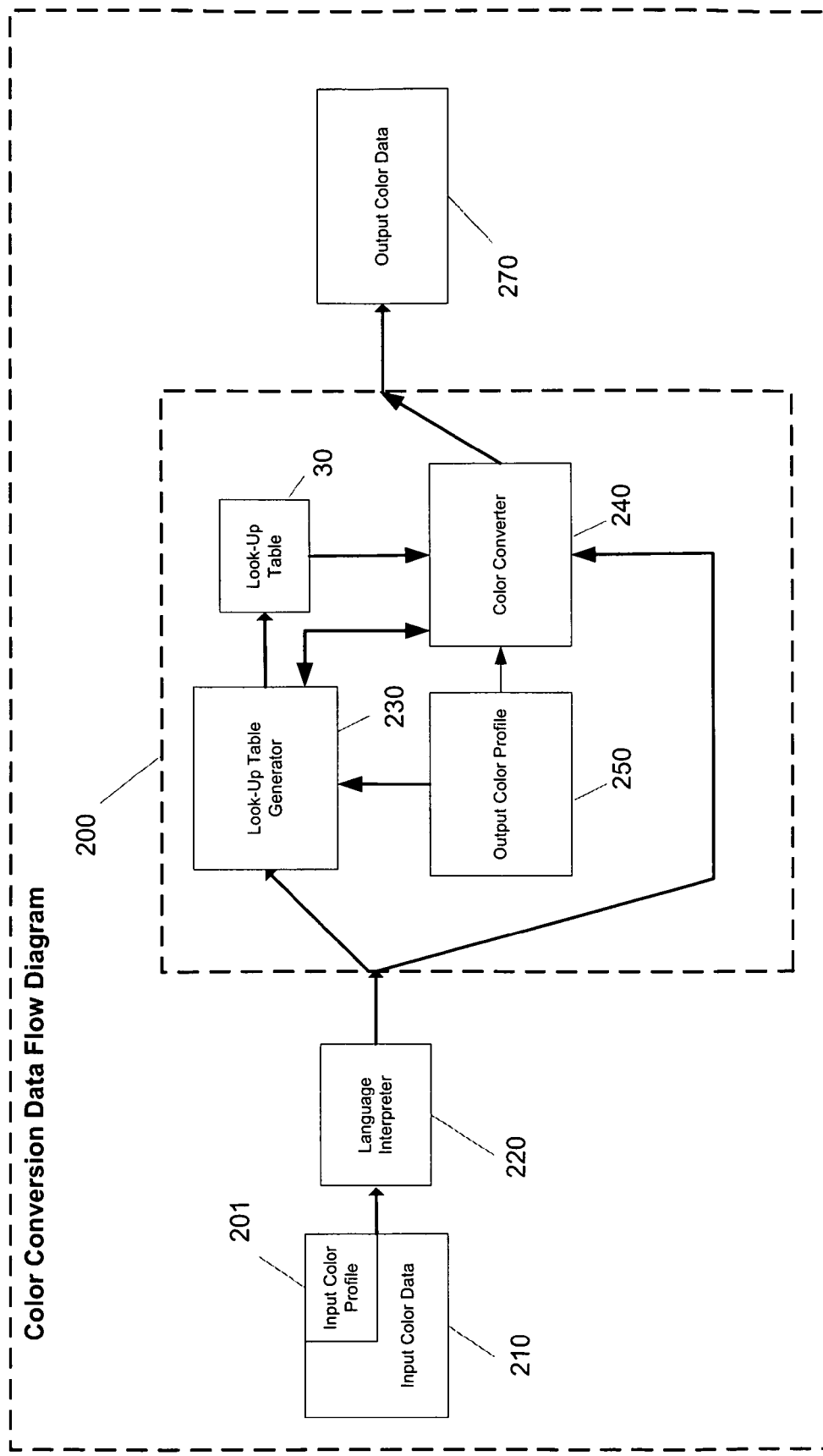
FIG. 2 shows a block diagram indicating an exemplary data flow for color conversion.

FIG. 2 shows a block diagram indicating an exemplary data flow for color conversion according to disclosed embodiments. In some embodiments, color management module ("CMM") 200 may include codes that can be executed by CPU 120 to perform various color conversion operations. In some embodiments, a language processor 220 may be included and configured to receive and process input color data 210 before the data are sent to CMM 200. Input color data 210 may include one-dimensional color data (e.g., gray scale) or multi-dimensional color data (e.g., RGB). In some embodiment, input color data 210 may be associated with a subset of the source color space, i.e., input color data 210 may not contain all the possible color values in source color space. For example, source color space may be an RGB color space, but input color data 210 may only contain black and white color values. In an extreme case, the subset may also be the entire source color space.

Input color data 210 may further include an input color profile 201 that describes information related to the source color space used by input device 50. In some embodiments, color conversion schemes may make use of an international color consortium (ICC) specification. The ICC specification permits the creation of a device-specific profile that describes the native device color space for a device, and additional related information needed to convert color data between this native device color space and a device independent color space, known as a profile connection space (PCS). The ICC profile format supports a variety of device-dependent and device-independent color spaces, including, for example, CIE XYZ based color spaces, RGB based color spaces, and CMY based color spaces.

In some embodiments, input color profile 201 may specify a source color space. For example, a commonly known and/or widely used color space such as SRGB may be specified by input color profile 201. In one embodiment, a detailed ICC specification of the SRGB may be stored in memory 140 or secondary storage 170 of printer 10, and language processor 220 may recognize the SRGB color space and obtain the corresponding ICC specification. In some embodiments, input color profile 201 may include the detailed ICC specification of the source color space.

Language processor 220 may be configured to interpret input color data 210, along with input color profile 201, and convert them to a format that can be recognized by CMM 200. For example, input color data 210 may include three-dimensional color data, which may be organized pixel by pixel, so that three color values for one pixel may be followed by three color values for a succeeding pixel. On the other hand, CMM 200 may be configured to recognize color data as being organized plane by plane so that pixel values for one plane may be followed by pixel values from a succeeding plane. Under such conditions, language processor 220 may be configured to re-organize input color data 210 into a format compatible with the configuration of CMM 200. If input color profile 201 specifies a source color space without detailed specification, language processor 220 may be further configured to recognize the source color space and obtain the corresponding specification, which can be stored on memory 140 or secondary storage 170.

In some embodiments, input color data 210 may further include an output color profile (not shown), if the output color space is different from the native color space of printer 10. The output color profile may describe the output color space and related information needed for the color conversion. Without limitation, and for the exemplary embodiments described in the present disclosure, color conversions from the source color space of input device 50 to the native color space of printer 10 are discussed. The techniques disclosed may be easily adapted by one of reasonable skill in the art to situations where color conversions occur from the source color space to a specified output color space.

Exemplary CMM 200 may include, among other things, a look-up table generator 230 and a color converter 240. In some embodiments, look-up table generator 230 may generate look-up table 30, which may be used by color converter 240 to perform color space conversions. Look-up table 30 may be stored in memory 140 and/or secondary device 170 of printer 10. Both look-up table generator 230 and a color converter 240 may be configured to obtain and/or store color data and/or other color conversion related information in look-up table 30 using native color profile 250. It should be noted that the functional modules outlined in FIG. 2 are exemplary only and other combinations of modules may be used to perform similar functions. For example, look-up table generator 230 and a color converter 240 may be combined into a single module that combines their individual functionalities. In general, various other combinations of the modules are contemplated and may be apparent to one of reasonable skill in the art.

In some embodiments, color conversion from a source color space to the native color space may include two steps: a first conversion from the source color space to PCS (which may be characterized by an exemplary mapping function f) and a second conversion from PCS to the native color space (which may be characterized by an exemplary mapping function g). The mapping functions f and/or g may take a form of sMt, where s and t are separable or color plane-by-color plane mappings and M is a mapping transfer function. For example, for the mapping f, when PCS is a three-dimensional space and the source color space is a k-dimensional space, then s may consist of three one-dimensional functions of one variable, M may be an k×3 function from k dimensions to three dimensions, and t may consist of k one-dimensional functions of one variable.

M may be a linear mapping or a non-linear mapping. If M is a linear mapping, M may be represented by a matrix, and if M is a non-linear mapping, M may be described as a look-up table. In some embodiments that use an ICC specification, for example, the look-up table representation of M can contain a mapping of some selected values with the mapping for other values being determined using interpolative methods.

In some embodiments, look-up table generator 230 may be configured to construct a single mapping that composes both the mapping $f=s_1 M_1 t_1$ from the source color space to PCS and the mapping $g=s_2 M_2 t_2$ from PCS to the native color space into a single mapping fg: $fg=g \circ f = s_1 M t_2$, where $M=M_1 t_1 s_2 M_2$ (here $\circ$ denotes function composition). In some embodiments, $M_1$ and $M_2$ may both be described by individual look-up tables included in input color profile 201 and/or native color profile 240, respectively. M may be described to the level of accuracy desired by look-up table 30.

Figure 3:
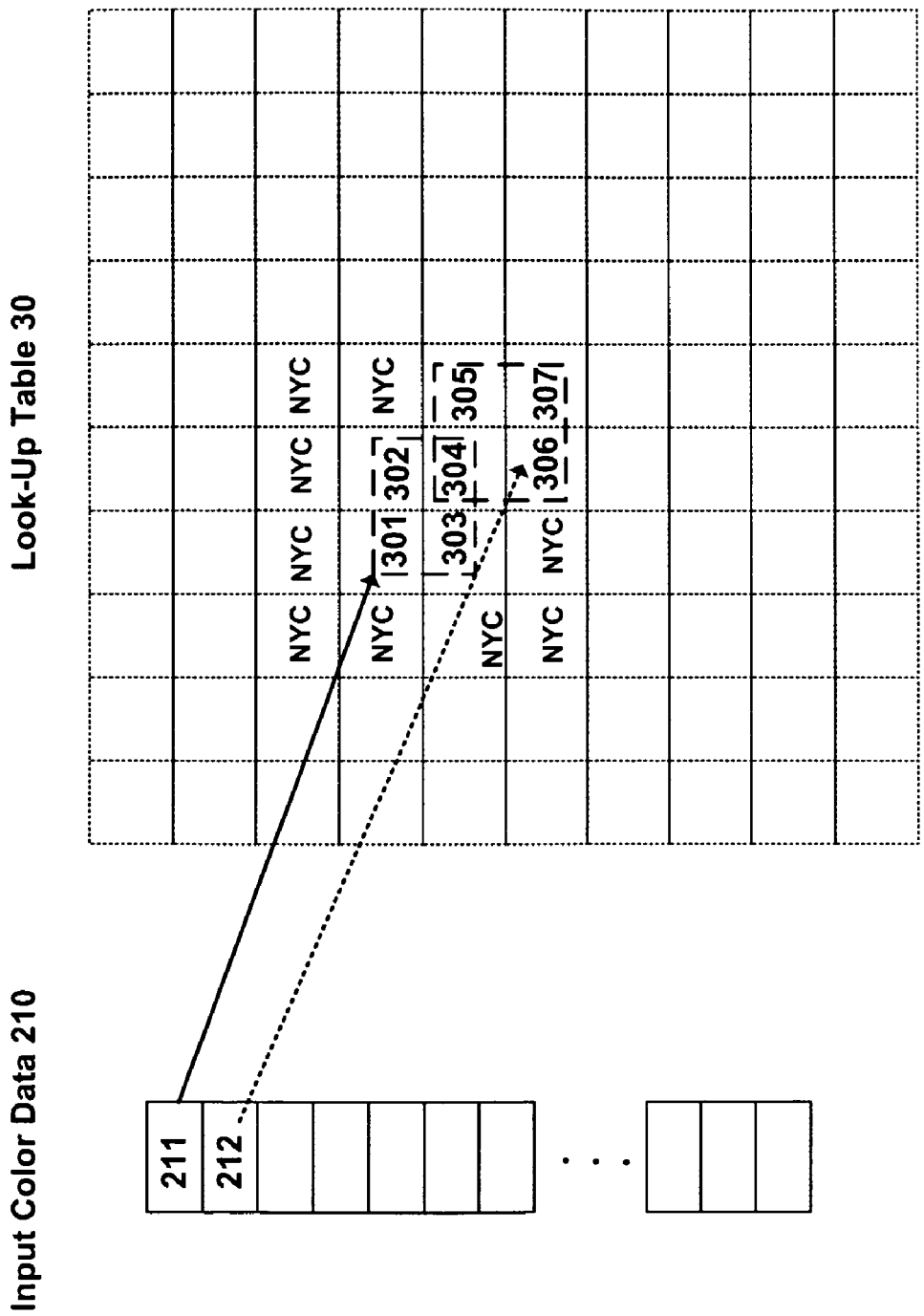
FIG. 3 shows an illustration of a color conversion look-up table.

FIG. 3 shows an illustration of exemplary color conversion look-up table 30 according to the disclosed embodiments. In some embodiments, entries in look-up table 30 may be dependent on $M_1$ and $M_2$, and can be independent of input color data 210. During the color conversion process, color converter 230 may access and look up entries in look-up table corresponding to color values that are to be converted. By constructing look-up table 30 dynamically, resources allocated to the a priori construction and storage of large look-up tables, such as for conversions between multi-dimensional color spaces, can be more optimally utilized.

Consistent with embodiments of the present disclosure, look-up table generator 230 may be configured to construct look-up table 30 on a needed basis, based on input color data 210. Look-up table generator 230 may initialize look-up table 30 by setting all entries to a default value, which indicates that the value awaits computation. The default value is indicated in FIG. 3 as "NYC"—"not yet computed," for descriptive purposes only. In some embodiments, after initialization, look-up table generator 230 may start constructing look-up table 30. Look-up table generator 230 may go through input color data 210 in order and determine, for each color value, the corresponding entries of look-up table 30 that are needed for converting the color value.

For example, as shown in FIG. 3, look-up table generator 230 may start with color value 211, and determine that entries 301-304 are needed for converting color value 211. Initially, none of entries 301-304 may have been computed and have the value indicated by NYC. Therefore, look-up table generator 230 may compute these entries, for example, by using $M_1$ and $M_2$, as specified in input color profile 201 and native color profile 250, respectively. Look-up table generator 230 may then move on to color value 212 and determine that entries 304-307 are needed for converting color value 212. At this point, entry 304 may have already been computed, while entries 305-307 indicate NYC. Accordingly, look-up table generator 230 may now compute entries 305-307 based on $M_1$ and $M_2$, but skip entry 304, which has already been computed. These sets of values may then be used to compute the values for 211 and 212.

Because the number of color values contained in input color data 210 is often limited, look-up table 30 occupies only a subspace of the source color space. Accordingly, only a subset of entries of look-up table 30 may be computed and stored. Therefore, computation time may be saved significantly and the speed of color conversion may be improved.

Color converter 230 may be configured to convert input color data 210 to output color data 270 by computing fg: $fg = g \circ f = s_1 M t_2$, wherein the values of M needed for conversion can be stored in look-up table 30. In some embodiments, output color data 270 may be associated with a subset of the native color space. According to one embodiment, the subset may be the entire native color space. Output color data 270 may be provided to other components of the device that CMM 200 is associated with, such as print engine 160 of printer 10.

Figure 4:
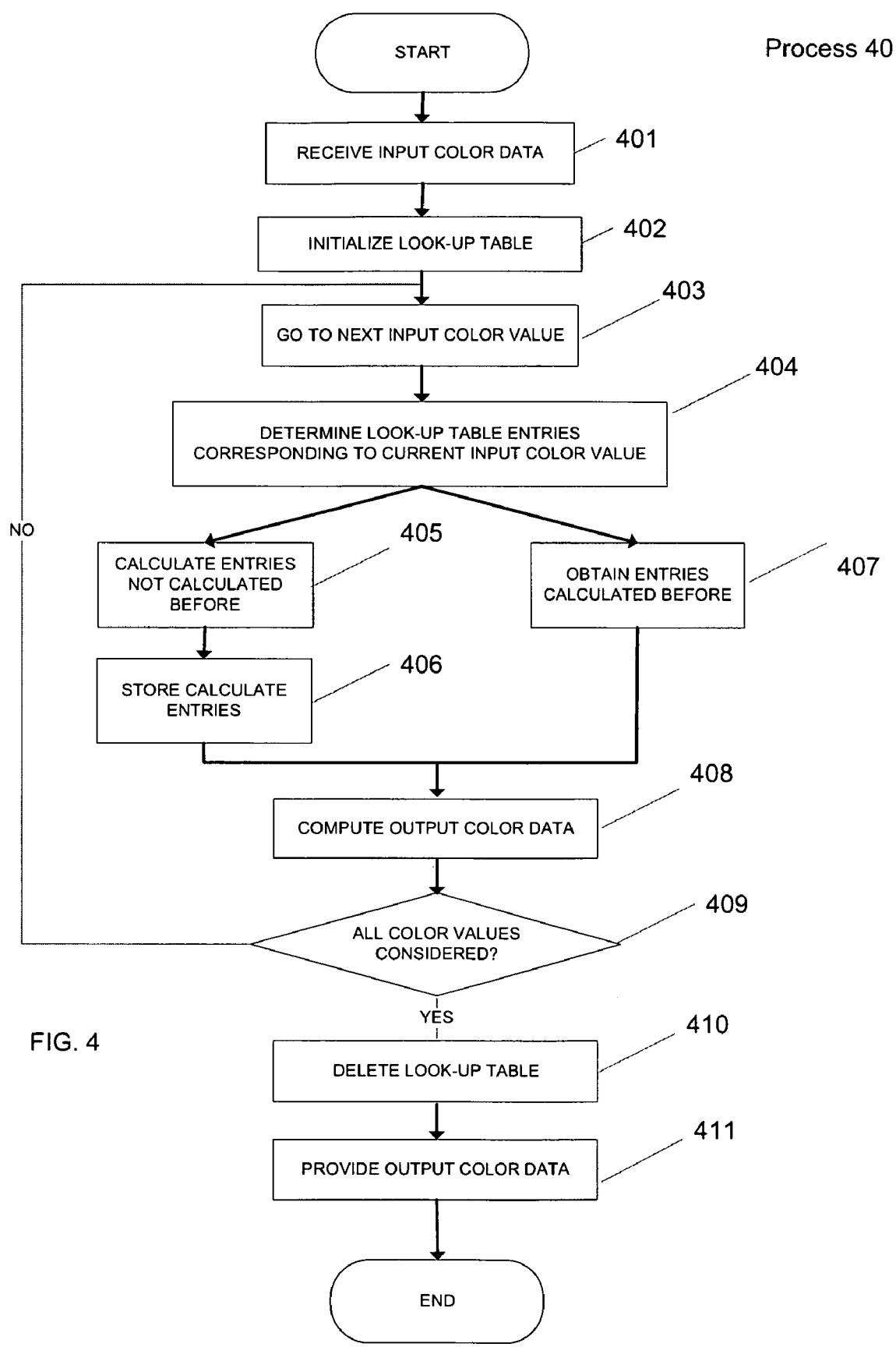
FIG. 4 is a flow chart of an exemplary color conversion operation process.

FIG. 4 is a flow chart of an exemplary color conversion operation process 40 consistent with disclosed embodiments. The algorithm described in FIG. 4 may also be applied to various other types of printing devices such as, for example, copiers and multi-function devices, various types of visual display devices such as, for example, monitors, and various types of image generating devices such as, for example, cameras, with appropriate modifications specific to the device and in a manner consistent with embodiments disclosed herein. The algorithm described in FIG. 4 may further be used in conjunction with various software applications that perform color space conversion.

In step 401, input color data 210 may be received by printer 10. For example, color data 210 may be received from input device 50. In some embodiments, input color data 210 may further include input color profile 201 that describes the source color space used by input device 50 and any other information related to converting color data from the source color space to a device independent color space, such as a PCS. Input color data 210 may be further processed by language processor 220 to a format that can be recognized by CMM 200. In some embodiments, an output color profile may also be received, along with input color data 210. The output color profile may include a specification of the output color space and related information for converting color data from PCS to the output color space. In some embodiments, such as when the output color space is a native color space of the device or application, no output profile may be supplied. Input color data 210 and any output color profile (if received) may be stored in memory 140 or secondary storage 170.

In step 402, look-up table 30 may be initialized. For example initialization may occur through CMM 200. For example, all entries in look-up table 30 may be set to default value to indicate that they have not yet been computed—"NYC". Look-up table 30 may be created and stored in memory 140 or secondary storage 170. In some embodiments, a subset of entries of look-up table 30 that are known to be needed in the color conversion may be computed and stored. After the table initialization, the relevant portions of look-up table 30 may be updated. In some embodiments, CMM 200 may start updating relevant portions of look-up table 30. For example, if no entries have been computed during the initialization phase, CMM 200 may construct look-up table 30. On the other hand, if a subset of entries has been computed during the initialization stage, look-up table 30 may be updated by CMM 200.

The algorithm may iterate through steps 403-409 until all the color values have been considered. For example, CMM 200 may go through each color value in input color data 210. In step 403, the first or next color value of input color data 210 may be accessed. In step 404, the entries of look-up table 30 that are needed for color space conversion of the current color value may be determined. For example, CMM 200 may determine entries that correspond to the current color value and then determine whether each of these entries has already been computed.

In step 405, entries labeled "NYC" (i.e. that have not yet been computed) may be computed based on input color profile 210 and native color profile 250. Next, in step 406, the calculated entries in look-up table 30 may be stored in memory 140. In step 407, for entries that may have been previously computed (i.e., with values other than NYC), computations may be skipped and their values may be retained and re-used.

In step 408, output color data 270 may be computed based on the current color value of input color data 210 and the corresponding entries of look-up table 30. For example, CMM 200 may use color converter 230 to interpolate the current color value on to output color data 270 in the native color space according to the look-up table entries for the current color value. In some embodiments, the algorithm may compute mapping function values not described by look-up table 30 by interpolation using one or more entries in look-up table 30, before calculating output color data 270. In some other embodiments, the algorithm may compute color values of output color data 270 based on entries available in look-up table 30 and derive other color values of output color data 270 by interpolation.

In step 409, the algorithm determines if all the color values of input color data 210 have been considered. If there are any unconsidered color values remaining, steps 403-409 may be repeated for these remaining color values. If all color values have been considered then, in step 410, look-up table 30 may be deleted and the memory it occupies may be released. In some embodiments, deletion of look-up table 30 may occur if the source color space of input device 50 is uncommon and/or not widely used.

In some other embodiments, look-up table 30 may be persistently stored in memory 140 or secondary storage 170, if it may be re-used. For example, printer 10 may be aware of printing jobs in its queue from the same input device 50 where the input color data may have similar or identical characteristics to the color data currently converted. In some other embodiments, the subset of entries computed during the initialization stage may be stored and all other entries computed in step 405 may be deleted. In step 411, output color data 270 may be provided to other components of the device/application in which CMM 200 is included.

Other embodiments of the invention will be apparent to those skilled in the art from consideration of the specification and practice of the invention disclosed herein. In some embodiments, the above mentioned color conversion scheme and a standard color conversion scheme can be switched in accordance with the source color space. For example, the exemplary color conversion process 40 explained in FIG. 4 may be employed to generate look-up table 30 when the source color space is one that is uncommon, and a standard color conversion scheme, such as the one that pre-constructs look-up table 30, may be used otherwise. For another example, the exemplary color conversion process 40 explained in FIG. 4 may be used for calculating look-up table entries for a portion of color values in input color data 210, and a standard color conversion scheme may be utilized for the rest of color values. It is intended that the specification and examples be considered as exemplary only, with a true scope and spirit of the invention being indicated by the following claims.

What is claimed is:

1. A method for dynamically converting first color data to second color data using a look-up table, wherein the first color data is a subset of a first color space, and the second color data is a subset of a second color space, the method comprising:
   receiving at least one first color value in the first color data;
   identifying at least one look-up table entry needed for converting the at least one first color value;
   determining if the at least one look-up table entry has been previously calculated;
   if the at least one look-up table entry has not been previously calculated:
      (a) calculating a value for the at least one look-up table entry; and
      (b) storing the calculated value for the at least one calculated look-up table entry;
   if the look-up table entry has been previously calculated, skipping steps (a) and (b); and
   computing at least one value in the second color data corresponding to the at least one first color value based on the at least one first color value and the stored value of the at least one look-up table entry.

2. The method of claim 1, wherein the first color space is associated with a first color profile and the second color space is associated with second color profile, and wherein calculating at least one look-up entry is based on the first color profile and the second color profile.

3. The method of claim 2, wherein the first color profile describes a first mapping from the first color space to a profile connection space and the second profile describes a second mapping from the profile connection space to the second color space.

4. The method of claim 3, wherein the look-up table describes a mapping from the first color space to the second color space, as a combination of the first mapping and the second mapping.

5. The method of claim 1, wherein the look-up table entries are deleted after use.

6. The method of claim 1, wherein the look up table is initialized prior to computation by setting entries in the look-up table to a predetermined default value.

7. The method of claim 1, wherein the calculated look-up table entries are stored persistently.

8. A computer-readable medium that contains instructions which, when executed by a processor, perform steps in a method for dynamically converting first color data to second color data using a look-up table, wherein the first color data is a subset of a first color space, and the second color data is a subset of a second color space, the method comprising:
    receiving at least one first color value in the first color data;
    identifying at least one look-up table entry needed for converting the at least one first color value;
    determining if the at least one look-up table entry has been previously calculated;
    if the at least one look-up table entry has not been previously calculated:
        (a) calculating a value for the at least one look-up table entry; and
        (b) storing the calculated value for the at least one calculated look-up table entry;
    if the look-up table entry has been previously calculated, skipping steps (a) and (b); and
    computing at least one value in the second color data corresponding to the at least one first color value based on the at least one first color value and the stored value of the at least one look-up table entry.

9. The computer-readable medium of claim 8, wherein the look-up table entries are deleted after use.

10. The computer-readable medium of claim 8, wherein the first color space is associated with a first color profile and the second color space is associated with second color profile, and wherein calculating at least one look-up entry is based on the first color profile and the second color profile.

11. The computer-readable medium of claim 10, wherein the first color profile describes a first mapping from the first color space to a profile connection space and the second profile describes a second mapping from the profile connection space to the second color space.

12. The computer-readable medium of claim 11, wherein the look-up table describes a mapping from the first color space to the second color space, as a combination of the first mapping and the second mapping.

13. The computer-readable medium of claim 8, wherein the calculated look-up table entries are stored persistently.

14. The computer-readable medium of claim 8, wherein the look up table is initialized prior to computation by setting entries in the look-up table to a predetermined default value.

15. A color conversion system, comprising:
    an input interface configured to receive the first color data, wherein the first color data is a subset of a first color space;
    a storage device configured to store the first color data and instructions for dynamically converting the first color data to a second color data using a look-up table, wherein the second color data is a subset of a second color space; and
    a processor coupled to the input interface and the storage device, wherein the processor is configured to execute the instructions to perform the steps of:
        receiving at least one first color value in the first color data;
        identifying at least one look-up table entry needed for converting the at least one first color value;
        determining if the at least one look-up table entry has been previously calculated;
        if the at least one look-up table entry has not been previously calculated:
            (a) calculating a value for the at least one look-up table entry; and
            (b) storing the calculated value for the at least one calculated look-up table entry;
        if the look-up table entry has been previously calculated, skipping steps (a) and (b); and
        computing at least one value in the second color data corresponding to the at least one first color value based on the at least one first color value and the stored value of the at least one look-up table entry.

16. The color conversion system of claim 15, wherein the storage device is further configured to persistently store the constructed look-up table.

17. The color conversion system of claim 15, wherein the first color space is associated with a first color profile which describes a first mapping from the first color space to a profile connection space and the second color space is associated with second color profile which describes a second mapping from the profile connection space to the second color space, and wherein the look-up table describes a mapping from the first color space to the second color space, as a combination of the first mapping and the second mapping.

18. The color conversion system of claim 17, wherein the input interface is further configured to receive the second color profile.

* * * * *